March 31, 1970  A. RAAB  3,503,474
WELDED SHOCK ABSORBER ASSEMBLY
Filed March 27, 1968
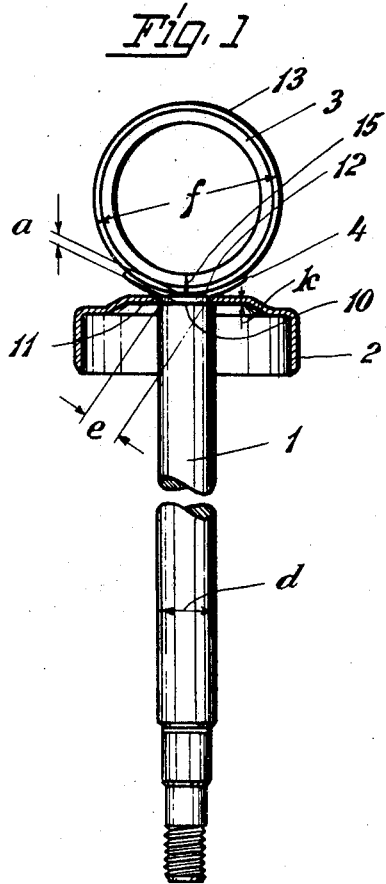
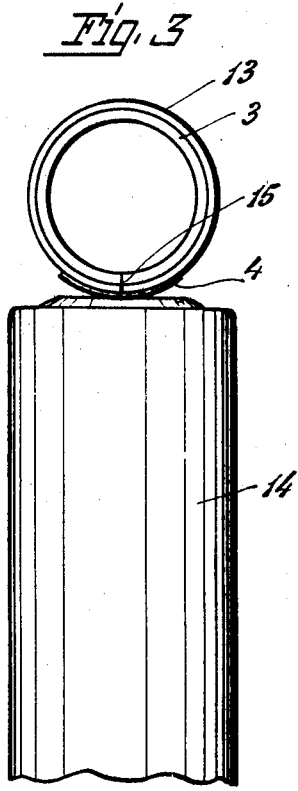
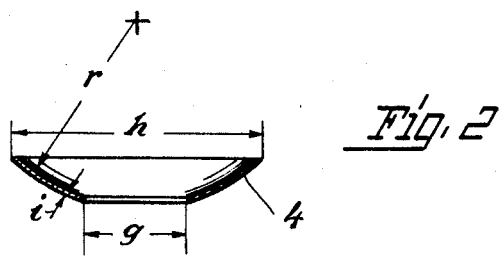
INVENTOR.
August Raab
By: Row and Berman
Agents

United States Patent Office 3,503,474
Patented Mar. 31, 1970

3,503,474
WELDED SHOCK ABSORBER ASSEMBLY
August Raab, Schweinfurt, Germany, assignor to Fichtel & Sachs Aktiengesellschaft, Schweinfurt, Germany
Filed Mar. 27, 1968, Ser. No. 716,442
Claims priority, application Germany, Apr. 1, 1967, F 52,006
Int. Cl. F16f 9/32
U.S. Cl. 188—100     6 Claims

ABSTRACT OF THE DISCLOSURE

Mounting rings are attached to the piston rod or the cylinder of a shock absorber by interposing an annular spherically dished washer between the cylindrical outer ring surface and an end face of the piston rod or cylinder, the convex side of the washer engaging the end face, compressing the washer between the ring and the end face until they touch each other through the aperture in the washer, and passing welding current between the ring and end face. The weld metal is contained in the washer without spattering.

BACKGROUND OF THE INVENTION

This invention relates to automotive shock absorbers, and particularly to welded shock absorber assemblies.

The type of shock absorber with which this invention is more specifically concerned has a cylinder from which a rod axially projects. A piston in the cylinder may be attached to the rod, but other internal arrangements are also known. It is common practice to attach the approximately cylindrical outer face of a mounting ring to an end face of the rod, of the cylinder, or of both, resistance welding being usually resorted to.

While this attaching method has obvious advantages, some of the fluid weld metal is spattered, congeals on surfaces of the shock absorber assembly where it is not wanted, and must be removed in a separate cleaning operation.

An object of this invention is the provision of a shock absorber assembly which can be welded without spattering of weld metal.

Summary of the invention

In a shock absorber assembly of this invention, an annular washer, preferably dished, is interposed between the mounting ring and the end face of the rod or cylinder in a position in which the axes of the ring and washer are transverse to each other, and a body of weld metal partly received in the central aperture of the washer integrally connects the mounting ring to the end face and to the washer, all elements of the assembly being of metallic material.

Other features, additional objects and many of the attendant advantages of this invention will readily be appreciated as the same becomes better understood by reference to the following detailed description of a preferred embodiment when considered in connection with the appended drawing.

Brief description of the drawing

In the drawing:

FIG. 1 shows a portion of a shock absorber of the invention in side elevation, and partly in section;

FIG. 2 shows an element of the shock absorber of FIG. 1 in side-elevational section on a larger scale; and FIG. 3 shows another portion of the same shock absorber in side elevation.

Description of the preferred embodiment

Referring now to the drawing in detail, and initially to FIG. 1, there is seen a portion of an automotive shock absorber assembly of the conventional type which mainly consists of a sealed cylinder and a piston movable in the cylinder. Liquid in the cylinder flows through a restricted opening in the piston, and the sprung and unsprung masses of the vehicle are respectively fastened to the cylinder and to a piston rod axially projecting from the cylinder.

FIG. 1 shows the piston rod 1 having one threaded terminal portion which normally carries the piston in the cylinder. The main portion of the piston rod 1 has a diameter $d$, and the other terminal portion 10 of the piston rod is of reduced diameter $e$. The reduced terminal portion 10 has an axial length $a$. It conformingly engages a central opening in the bottom of a cap 2 which has the shape of an inverted cup coaxial with the rod 1.

The terminal end portion 10 is also received in a conforming opening of a dished annular washer 4 whose axis coincides with the axis of the rod 1. The radial end face 12 of the end portion 10 abuttingly engages the outer cylindrical wall 13 of a mounting ring 3 whose axis is perpendicular to the axis of the piston rod 1. The ring 3 is made from a flat steel bar bent to form a cylinder of outer diameter $f$ and having a seam 15 located approximately in a plane defined by the axes of the rod 1 and of the ring 3.

The washer 4, prior to its assembly with the other shock absorber elements seen in FIG. 1, has the shape seen in FIG. 2, its inner diameter being $g$, its outer diameter $h$, its wall thickness being $i$, and the radius of curvature of its inner face being $r$. In its initial, relaxed condition, as shown in FIG. 2, the washer 4 is axially symmetrical.

The axial length of the mounting ring 3 is 75% of the diameter $f$. The inner diameter $g$ of the relaxed washer 4 is 45% of the axial length of the mounting ring 3. The outer diameter $h$ of the washer is equal to the axial length of the ring 3, and the radius of curvature $r$ of the washer is 75% of the length of the ring 3, all dimensional relationships relating to the spherically dished washer 4 in the relaxed original condition shown in FIG. 2. The wall thickness of the illustrated dished ring is 0.5 mm.

The portion of the shock absorber seen in FIG. 1 is assembled by slipping the cap 2 and the washer 4 over the reduced terminal portion 10 of the piston rod 1, the side wall of the cap 2 and the convex face of the washer 4 being directed toward the threaded end of the piston rod 1 which normally carries the piston. The mounting ring 3 is superimposed on the concave side of the washer 4 so that the axis of the washer 4 bisects the ring axis, and the subassembly so produced is placed in a clamping arrangement which moves the mounting ring 3 against the end face 12 of the piston rod 1, thereby resiliently deforming the washer 4. When current of adequate strength is passed between the piston rod 1 and the mounting ring 3, the ring is welded to the face 12 of the rod, to the cap 2, and to the washer 4 without any spattering of the molten weld metal which is contained within the concave face of the washer. The seam 15 of the mounting ring 3 is simultaneously secured by the weld.

The afore-mentioned dimensional relationships of the mounting ring 3 and the washer 4 may be varied to some extent without losing the davantages of this invention. The axial length of the mounting ring 3 may be between 60 and 90% of its outer diameter $f$, the inner diameter of the washer 4 may be between 30 and 60% of the axial length of the mounting ring 3, the outer diameter of the washer 4 may be between 80 and 120% of the mounting ring length, and the concave face of the washer 4 may have a radius of curvature of 60 to 90% of the mounting ring length. The wall thickness of the dished ring 4 may be 0.3 to 1 mm., and is preferably between 0.4 and 0.7 mm., and smaller than the wall thickness $k$ of the cap 2. The combined thicknesses $k$ and $i$ are equal to the length $a$ of the reduced piston rod portion 10.

With the proper dimensional relationships between the mounting ring 3 and the dished annular washer 4, the washer is deformed in such a manner that the weld is contained near the terminal rod portion 10, and the welded seam, while present between the end face 12 and the outer face of the ring 3, is too small to be capable of pictorial representation on the scale of FIG. 1.

As is shown in FIG. 3, the cylinder 14 of the illustrated shock absorber is also provided with a mounting ring 3 identical with the ring discussed with reference to FIG. 1. It is attached to a radially extending end face of the cylinder 14 and an annular washer 4 identical, prior to installation, with the washer seen in FIG. 2, and is welded to the cylinder 14 through an opening in the washer.

The dished annular washer 4 is useful not only in the welding of mounting rings to the piston rods and cylinders of shock absorbers, but generally reduces weld spattering when a ring having an approximately cylindrical outer face is to be welded to a face of another object tangentially oriented relative to the ring face.

The method of the invention is used to greatest advantage where a multiplicity of connections is simultaneously established by a body of molten weld metal integrally wetting several machine elements as shonw in FIG. 1. The weld metal partly contained in the washer 4 integrally connects the two ends of the ring 3, the cap 2, and the piston rod 1 when permitted to solidify. The connected elements all consist of steel in the illustrated embodiment, but the invention is applicable to all metals and combinations of metals capable of being welded.

It should be understood, therefore, that the foregoing disclosure relates only to a preferred embodiment of the invention, and that it is intended to cover all changes and modifications of the embodiment of the invention herein chosen for the purpose of the disclosure which do not consitute departures from the spirit and scope of the invention.

What is claimed is:

1. In a shock absorber assembly including a cylinder member having an axis, a rod member axially projecting from said cylinder member, a mounting ring having an axis and an approximately cylindrical outer face about the axis thereof, and fastening means fastening said ring to one of said members in a position in which said axes are transverse to each other, the improvement in the fastening means which comprises:
    (a) a dished annular washer defining a central aperture,
        (1) said one member having an end face transverse to the axis of said cylinder member,
        (2) said washer having opposite convex and concave annular faces about said aperture, said convex face being superimposed on said end face,
        (3) said ring being superimposed on said washer, said outer face engaging said concave face,
        (4) said washer, said ring and said end face being of metallic material; and
    (b) a body of weld metal partly received in said aperture integrally connecting said end face, said outer face of said ring, and said concave face of said washer.

2. In an assembly as set forth in claim 1, said washer consisting of resilient material, said ring having an axial lentgh equal to 60 to 90 percent of the outer diameter thereof, said washer, when in the relaxed condition, having an inner diameter equal to 30 to 60 percent of said axial length, the outer diameter of said washer in said condition being between 80 and 120 percent of said axial length, said concave face being substantially spherically curved in said condition and having a radius of curvature of 60 to 90 percent of said axial length.

3. In an assembly as set forth in claim 1, said ring being formed with a seam substantially in a plane including said axes, said weld metal integrally connecting respective portions of said ring on opposite sides of said seam.

4. In an assembly as set forth in claim 1, said one member being said rod member and having an axially terminal portion of reduced diameter received in said central aperture and carrying said end face.

5. In an assembly as set forth in claim 4, a cap member having the approximate shape of a cup having a bottom and a side wall, the bottom of said cup being apertured, receiving said terminal portion and abuttingly engaging said convex annular face, the side wall of said cup extending from said bottom in a direction away from said washer.

6. In an assembly as set forth in claim 5, the axial length of said reduced portion being substantially equal to the combined thickness of said washer and of said cap member.

References Cited

UNITED STATES PATENTS 2,106,272    1/1938    Elsey.
2,366,579    1/1945    Ahrens _____ 219—160 X

OTHER REFERENCES

German printed application 1,115,858, October 1961, Guler.

GEORGE E. A. HALVOSA, Primary Examiner

U.S. Cl. X.R.

219—107; 228—21